United States Patent
Haughay, Jr. et al.

(10) Patent No.: US 8,392,505 B2
(45) Date of Patent: Mar. 5, 2013

(54) COLLABORATIVE PLAYLIST MANAGEMENT

(75) Inventors: Allen P. Haughay, Jr., San Jose, CA (US); Michael Ingazio Ingrassia, Jr., San Jose, CA (US); Jeffrey T. Lee, Sunnyvale, CA (US); Ryan Perry, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/238,714

(22) Filed: Sep. 26, 2008

(65) Prior Publication Data

US 2010/0082731 A1    Apr. 1, 2010

(51) Int. Cl.
 *G06F 15/16* (2006.01)
(52) U.S. Cl. ......................... 709/205; 709/231
(58) Field of Classification Search .......... 709/204–207, 709/231; 707/104.1, 200, 201, 203, 205, 707/912–916, 999.2–999.203
See application file for complete search history.

(56) References Cited

U.S. PATENT DOCUMENTS

| | | | |
|---|---|---|---|
| 7,073,191 B2 | 7/2006 | Srikantan et al. | |
| 2003/0135513 A1* | 7/2003 | Quinn et al. | 707/102 |
| 2005/0098023 A1* | 5/2005 | Toivonen et al. | 84/615 |
| 2005/0281414 A1 | 12/2005 | Simon et al. | |
| 2006/0195462 A1* | 8/2006 | Rogers | 707/100 |
| 2006/0195521 A1* | 8/2006 | New et al. | 709/204 |
| 2006/0212442 A1* | 9/2006 | Conrad et al. | 707/5 |
| 2006/0212444 A1* | 9/2006 | Handman et al. | 707/5 |
| 2006/0227673 A1* | 10/2006 | Yamashita et al. | 369/30.08 |
| 2007/0025194 A1* | 2/2007 | Morse et al. | 369/30.1 |
| 2007/0169115 A1 | 7/2007 | Ko et al. | |
| 2008/0065249 A1 | 3/2008 | Pang | |
| 2008/0091717 A1* | 4/2008 | Garbow et al. | 707/104.1 |
| 2008/0120501 A1* | 5/2008 | Jannink et al. | 713/163 |
| 2008/0125889 A1 | 5/2008 | Atherton et al. | |
| 2008/0168129 A1 | 7/2008 | Robbin et al. | |
| 2008/0183757 A1 | 7/2008 | Dorogusker et al. | |
| 2008/0208775 A1* | 8/2008 | Vossen et al. | 706/12 |
| 2010/0057928 A1* | 3/2010 | Kapoor et al. | 709/231 |

OTHER PUBLICATIONS

Featured iPhone Application, http://lifehacker.com/398278/remote-app-controls-itunes-playback-from-..., 1 page.

* cited by examiner

*Primary Examiner* — Brendan Higa
(74) *Attorney, Agent, or Firm* — Kilpatrick Townsend & Stockton LLP

(57) ABSTRACT

Systems, methods, and computer program products are provided for collaboratively managing a playlist of media items including a communications interface. The communications interface may be configured to receive a user feedback from each of a plurality of portable media devices and may include a processor configured to generate an updated playlist based on the user feedback. The user feedback may be related to a queued media item in a playlist.

34 Claims, 3 Drawing Sheets

100

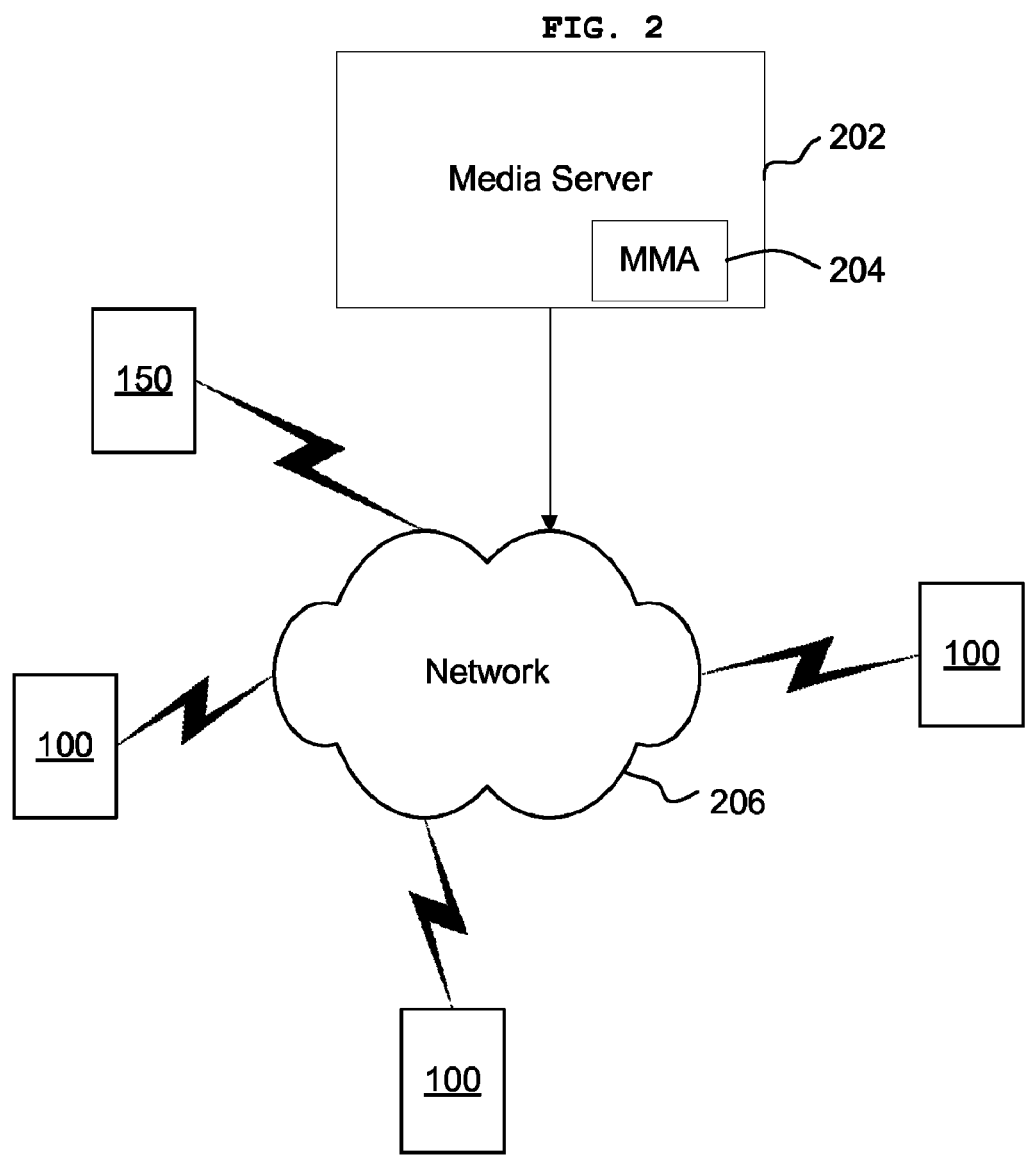

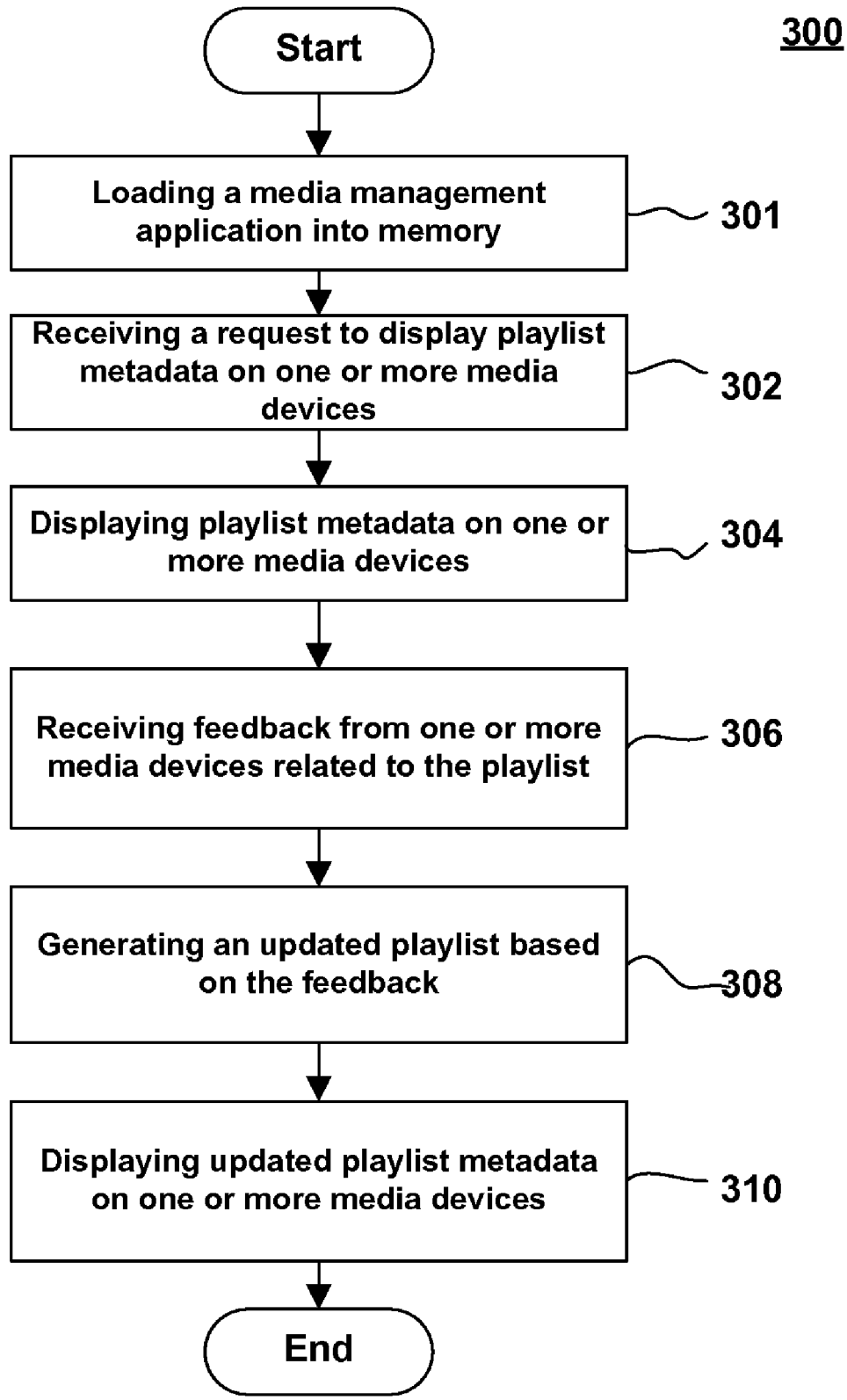

COLLABORATIVE PLAYLIST MANAGEMENT

FIELD OF THE INVENTION

The invention relates to managing a media playlist and, more particularly, to managing a media playlist collaboratively using portable media devices.

BACKGROUND OF THE DISCLOSURE

Most media management applications include a shuffle feature that allows users to playback a playlist of media items in a random order or some modified random order. This is a set-and-forget feature with no user interaction after the playlist begins playing. A media management application like iTunes from Apple Inc. features a Party Shuffle mode that takes this concept one step further by allowing users to change upcoming media items. To do so, however, listeners must be crowded around one computer running the media management application. A system and method is needed that allows listeners to more easily collaborate on media item selections.

SUMMARY OF THE DISCLOSURE

Embodiments of the invention relate to systems and methods for collaborative management of a playlist. Some embodiments of the invention relate to a media server that may include a communications interface and a processor. The communications interface may be configured to receive a user feedback from each of a plurality of portable media devices, where the user feedback may be related to a queued media item in a playlist. The processor may be configured to generate an updated playlist based on the user feedback.

Other embodiments of the invention relate to a computer program product for collaborative management of a playlist that may include causing the playlist to be displayed on a first client device and on a second client device, receiving a first feedback from the first client device and a second feedback from the second client device, and generating an updated playlist based on the first feedback and the second feedback. The first feedback and the second feedback may be related to a queued media item included in the playlist.

Other embodiments of the invention relate to a network for collaborative management of a playlist that may include a media server and a plurality of portable media devices. The plurality of portable media devices may be configured to receive playlist metadata from the media server and to receive a feedback from the plurality of portable media devices. The feedback may be related to a queued media item included in the playlist. The media server may be configured to generate an updated playlist based on a composite feedback based on the feedback.

Other embodiments of the invention relate to a portable media device for managing a playlist that may include a display, a user input device, a communications interface, and a processor. The processor may be configured to present on the display a remote application including metadata associated with a queued media item, to receive a feedback from the user input device related to the queued media item and to transmit the feedback to the communications interface.

Other embodiments of the invention relate to a method for collaborative management of a playlist that may include causing a plurality of metadata associated with the playlist to be displayed on a first media device and on a second media device, receiving a first feedback from the first media device and a second feedback from the second media device, and generating an updated playlist based on a composite feedback based on the first feedback and second feedback. The first feedback and the second feedback may be related to a queued media item included in the playlist.

BRIEF DESCRIPTION OF THE DRAWINGS

The above and other aspects and features of the invention will become more apparent upon consideration of the following detailed description, taken in conjunction with the accompanying drawings, in which like reference characters refer to like parts throughout, and in which:

FIG. 2 is simplified functional block diagram of a system for managing a playlist according to some embodiments of the invention; and FIG. 3 is a process diagram of an exemplary method for collaborative management of a playlist using portable media devices according to some embodiments of the invention.

DETAILED DESCRIPTION OF THE DISCLOSURE

Figure 1:
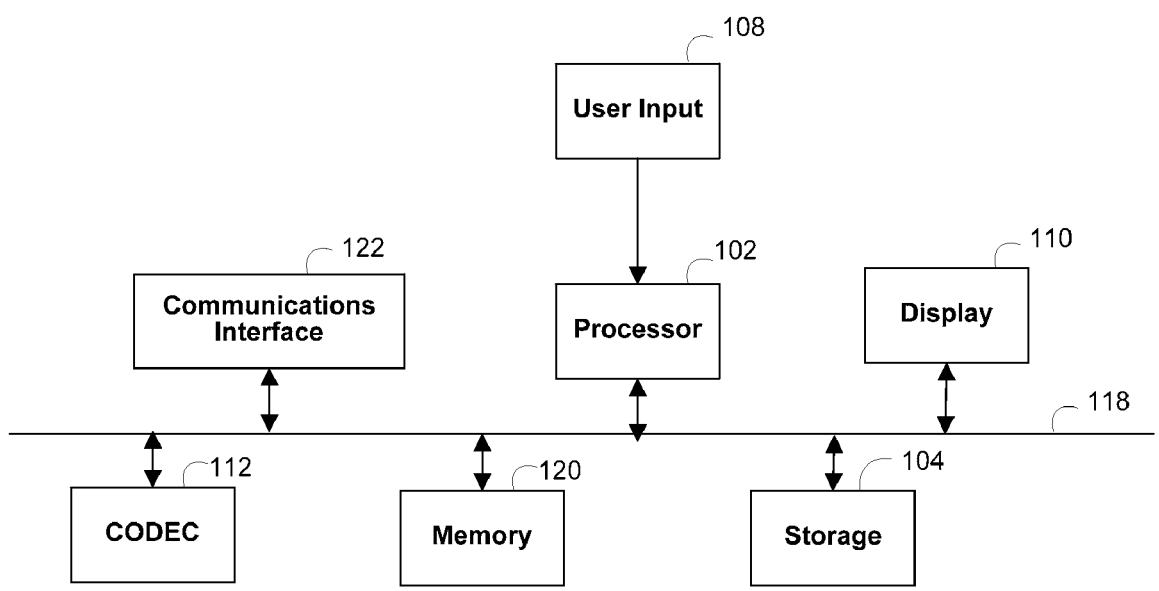
FIG. 1 shows a simplified block diagram of a portable media device for managing a playlist according to some embodiments of the invention.

Embodiments of the invention relate to collaborative management of a playlist of media items using portable media devices. For example, in some embodiments, a media server may be configured to collaboratively manage a playlist based on feedback received from a plurality of portable media devices. The feedback may be related to a queued media item in the playlist. The media server may be configured to evaluate the feedback and generate an updated playlist and then transmit the updated playlist to the portable media devices.

In the following discussion of illustrative embodiments, the term "media items" generally refers to data that encodes audio, video, graphic, or other presentation information or content including, but not limited to, podcasts, movies, TV shows, and audiobooks. The term "playlist," as used herein, generally refers to a custom index of media items that may be played according to a default sequence. The terms "metadata" and "playlist metadata" are used interchangeably and broadly refer to data that describes the media content including, for example, song title, artist, genre, and duration for media items in a playlist or part of a playlist. The term "broadcast" broadly refers to the real-time or near real-time distribution of content (e.g., playlist metadata) via a wired or wireless medium to an arbitrary number of devices configured to receive the content. The term "database" broadly refers to a collection of information stored in some fashion. The terms "coupled to" or "in communication with," refer to, without limitation, any connection or coupling, either direct or indirect, between two or more elements whether physical, logical, electrical, or combinations thereof. As one skilled in the art will appreciate, inferred coupling (that is, where one element is coupled to another element by inference) includes direct and indirect coupling between two elements in the same manner as "coupled." The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "based on," as used in the claims and specification herein, is not exclusive and allows for being based on additional factors that may or may not be described.

It is to be understood that the figures and descriptions of the invention have been simplified to illustrate elements that are relevant for a clear understanding of the invention while eliminating, for purposes of clarity, other elements. For example, details relating to the creation of playlists on a media device are not described herein. Similarly, wireless networking is not described herein. A discussion of these elements is not provided because they are well known in the art and because they do not facilitate a better understanding of the invention.

FIG. 1 shows a simplified functional block diagram of a portable media device 100 according to some embodiments of the invention. Media device 100 may include a processor 102, a storage device 104, a user input device 108, a display device 110, a coder/decoder (CODEC) 112, a memory 120, and a communications interface 122 all coupled, either directly or indirectly, to a bus 118.

Processor 102 may be any processor, application-specific integrated circuit (ASIC), or any combination thereof, configured to control the operation of media device 100. For example, processor 102 can communicate with one or more media servers to transmit playlist metadata and receive user inputs from user input device 108. While media device 100 is illustrated with a single processor, those skilled in the art will appreciate that a media device may include multiple processors and/or co-processors.

Display device 110 may be used to display a user interface that includes information related to media items such as playlist metadata. The user interface may include, for example, a text or graphical description of media items in a playlist. In some embodiments, the user interface may be adapted to display playlist metadata related to at least some of the media items in the playlist. The user interface may also be adapted to visually identify the currently playing media item.

Storage 104 may be any storage device configured to store, for example, media items, configuration data, applications, and operating instructions. Storage 104 may include one or more non-volatile storage mediums, including for example, a hard-drive, flash memory, and permanent memory such as read-only memory ("ROM"). Storage 104 may store media items, software (e.g., for implanting functions on device 100), preference information (e.g., media playback preferences), wireless connection information (e.g., information that may enable media device 100 to establish wireless communication with a media server or other media devices), and any other suitable data.

Memory 120 may include one or more different types of memory which may be used for performing device functions. For example, memory 120 may include cache and/or random-access memory ("RAM").

User input device 108 may allow a user to interact with media device 100, such as to input feedback. User input device 108 can take a variety of forms, such as a button, keypad, dial, click wheel, or touch screen. User input device 108 may include navigation controls including, for example, skip forward and skip backward controls. Suitable configurations of user input device 108 are explained in greater detail in U.S. Patent Application Publication No. United States Patent No. 2008/0183757 to Dorogusker et al., published on Jul. 31, 2008, entitled "Tagging Media Assets, Locations, and Advertisements," which is incorporated by reference in its entirety.

A communications interface 122 may include circuitry for wireless communication (e.g., short-range and/or long range communication). For example, communications interface 122 may include Wi-Fi enabling circuitry that permits wireless communication according to one of the 802.11 standards. Other wireless network protocol standards could also be used, either as an alternative to the identified protocols or in addition to the identified protocols. Other network standards may include Bluetooth, the Global System for Mobile Communications ("GSM"), and code division multiple access ("CDMA") based wireless protocols. Communications circuitry 122 may also include circuitry that enables device 100 to be electrically coupled to another device (e.g., a computer or an accessory device) and communicate with that other device.

Bus 118 couples processor 102 to the other components and interfaces included in portable media device 100. Bus 118 can be configured to permit unidirectional and/or bidirectional communication between the components and interfaces. For example, processor 102 can retrieve information from, and transmit information to, storage device 104 over bus 118. In some embodiments, bus 118 may include a plurality of busses, each of which couples at least one component or interface of portable media device 100 with another component or interface. Coder/decoder (CODEC) 112 may be provided to convert digital audio signals into analog signals, which may be provided to an output port (not shown).

Device 100 may be a portable computing device. For example, media device 100 may be a media device (e.g., an MP3 player), a game player, a remote controller, a portable communication device (e.g., iPhone, iTouch), a remote ordering interface, or other suitable portable device. (iPhone and iTouch are registered trademarks of Apple Inc.) Media device 100 may be battery-operated and highly portable so as to allow a user to listen to music, play games or video, record video or take pictures, communicate with others, and/or control other devices. In addition, media device 100 may be sized such that is fits relatively easily into a pocket or hand of the user.

It is to be appreciated that FIG. 1 describes software that acts as an intermediary between users and the basic resources described in portable media device 100. Such software may include an operating system. The operating system, which can be resident in storage 104, acts to control and allocate resources of portable media device 100. System applications take advantage of the management of resources by the operating system through program modules and program data stored either in memory 120 or on disk storage 104. Furthermore, it is to be appreciated that the invention can be implemented with various operating systems or combinations of operating systems.

These are representative components of a portable media device whose operation is well understood. Furthermore, those of ordinary skill in the art will appreciate that the portable media device illustrated herein is exemplary only and that the invention can operate within a number of different configurations.

FIG. 2 is a simplified functional block diagram of a system 200 for managing a playlist according to some embodiments of the invention. System 200 includes a plurality of portable media devices 100 and a media server 202 coupled to a network 206 as shown. Media server 202 runs a media management application 204 with which users of portable media devices 100 may interact. Portable media devices 100 may be configured to receive a remote display from media server 202. In other embodiments, portable media devices 100 may run a remote application. Media management application ("MMA") 204 may be configured to manage media items stored locally on media server 202, stored remotely, or streamed from network 206. One example of a media management application is the iTunes application, available from Apple Inc. of Cupertino, Calif. (iTunes is registered trademark of Apple Inc.)

Media server 202 may be any information processing device configured to play media items, communicate with portable media devices 100, and forward control signals to MMA 204 for execution. For example, media server 202 may be a digital media receiver, such as Apple TV available from Apple Inc. (Apple TV is a registered trademark of Apple Inc.) Network 206 may be any network that allows portable media devices 100 to communicate with media server 202, including any wired or wireless network known to those skilled in the art.

In some embodiments, system 200 may also include an entertainment device 150, such as a television or home theater system, coupled to network 206, and configured to receive streamed media items from media server 202. According to such embodiments, portable media device 100 may be used to control media server 202 including playback of media items through entertainment device 150. Related embodiments are described in greater detail in U.S. Patent Application Publication No. 2007/0169115 to Ko et al., published on Jul. 19, 2007, entitled "Portable Media Player as a Low Power Remote Control and Method Thereof," which is incorporated by reference in its entirety.

FIG. 3 is a process diagram of an exemplary method 300 for collaboratively managing a playlist according to some embodiments of the invention. Method 300 begins, at step 301, as a media server loads a media management application into memory and begins playing a playlist. For example, media server 202 may load MMA 204 into memory 120 and may cause MMA 204 to begin playing a playlist. Playback of the playlist may be initiated in a variety of ways without departing from the spirit or scope of the invention.

At step 302, the media server may receive a request, such as from a portable media device, to display playlist metadata on the portable media device. For example, media server 202 may receive a request to transmit playlist metadata to portable media device 100 for display on display 110. In some embodiments, metadata may be embedded in the media file, such as with ID3 tags, or if an Internet connection exists, by completing an online lookup of a database, such as Compact Disc Database ("CDDB"). In some embodiments, metadata transmitted from the media server to the portable media device may include metadata associated with a catalog of all media items stored on (or available to) media server 202.

At step 304, the media server may respond to the request for playlist metadata by transmitting the metadata, such as for the currently playing playlist, to the requesting portable device. For example, media server 202 may transmit the playlist metadata to portable media device 100 via network 206. In some embodiments, media server 202 may transmit the playlist metadata to more than one media device 100. The portable media device may display some or all of the metadata received from the media server, which may include the currently playing media item, upcoming media items, or both. In some embodiments, multiple playlists may be displayed at once. The playlist may be displayed in any format from which a user of the portable media device can select media items and generate feedback. For example, playlist metadata may be displayed in a tabular or grid format that includes artist, title, and duration. Other display formats may be implemented without departing from the spirit or scope of the invention.

At step 306, the media server may monitor the network for and receive feedback, such as feedback associated with a particular media item. For example, media server 202 may monitor network 206 and receive feedback from one or more media devices 100. Feedback may be directed to the currently playing media item, a queued media item, and any other media item available for play. Feedback may come in the form of votes on particular media items. In some embodiments, feedback may include a broader range of ratings. Metadata may also be created or edited by users either before, during, or after play. One form of feedback may include tagging where a user of the portable media device assigns a piece of information to a media item so it can be found again by browsing or searching, such as on media server 202. Another form of feedback includes textual comments, such as comments about a queued or currently playing media item. Feedback may also include feedback responsive to feedback left by other listeners. For example, feedback generated from one media device may be transmitted to media server 202 and media server 202 may cause that feedback to be displayed on one or more media devices.

At step 306, the media server may also monitor the network for a request to add a media item or category to the playlist. In some embodiments, a user of media device 100 may select a media item, such as from a list of available media items, and transmit a request to media server 202, requesting that the media item be added to the queue of the playlist to be played by the media server. In some embodiments, requested media items may be streamed from a portable media device. Streamed media items may be played by the media server without storing the media items on the media server, aside from conventional buffering. For example, a party guest with a new song stored on a media device 100 can stream the new song from media device 100 to media server 202 so that media server 202 can play and other guests can hear, and optionally provide feedback on, the new track.

In step 308, the media server may process the feedback received in step 306 and generate an updated playlist based on a composite feedback. In some embodiments, media items that receive a threshold amount of negative votes or feedback from listeners may be deleted from the playlist queue or, if currently playing, terminated prematurely. Conversely, media items that receive a threshold amount of positive feedback may be moved up in the queue (i.e., promoted) or added if not already in the playlist. The threshold amount may be based on a percentage of participating users. The threshold amount may have a default setting or may be set by user preferences.

In step 310, the media server transmits the updated playlist to one or more portable media devices. In some embodiments, the updated playlist may be broadcast to all listeners so that the updated playlist appears on each portable device connected to the network. For example, if the queued song "Shattered" by the Rolling Stones receives a threshold number of negative votes, MMA 204 may delete that song from the playlist queue and then broadcast the updated playlist to be displayed by each portable media device 100. Step 310 may include broadcasting feedback received on a particular media item or playlist. For example, MMA 204 may cause media devices 100 to display feedback from a listener that includes a text message associated with a queued media item, such as "This band is playing at the Casino Club next Saturday!" Step 310 may also include broadcasting, for display, a summary of the feedback received for a media item or playlist.

While the systems and methods have been described with respect to communications initiated by either the media server or portable media device, information push and/or pull techniques may be used without departing from the scope of the invention.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

One of ordinary skill in the art should appreciate that the invention may take the form of an entirely hardware embodiment or an embodiment containing both hardware and software elements. In particular embodiments, such as those embodiments that relate to methods, the invention may be implemented in software including, but not limited to, firmware, resident software, and microcode.

One of ordinary skill in the art should also appreciate that the methods and systems of the application may be practiced in embodiments other than those described herein. It will be understood that the foregoing is only illustrative of the principles disclosed herein, and that various modifications can be made by those skilled in the art without departing from the scope and spirit of the invention or inventions.

What is claimed is:

1. A media server, comprising:
   a media management application configured to play a first playlist;
   a communications interface configured to receive a first user feedback from a first portable media device of a plurality of portable media devices when the media management application is broadcasting the first playlist to the plurality of portable media devices, wherein the first user feedback is related to a queued media item in the first playlist; and
   a processor configured to:
      generate an updated playlist based on the first user feedback, wherein the updated playlist includes a new media item not included in the first playlist;
      cause the new media item to be streamed from one of the plurality of portable media devices to the media server without storing the new media item on the media server; and
      direct the media management application to broadcast the updated playlist instead of the first playlist to the plurality of portable media devices, wherein the updated playlist comprises a change from the first playlist, wherein the change comprises one of the following: (i) a different set of media items than the first playlist and (ii) a different order of media items than the first playlist.

2. The media server of claim 1, wherein the communications interface is further configured to transmit metadata related to the first playlist to the plurality of portable media devices.

3. The media server of claim 1, wherein the communications interface is further configured to transmit metadata related to the updated playlist to the plurality of portable media devices.

4. The media server of claim 1, wherein the first user feedback comprises user ratings of the queued media item.

5. The media server of claim 1, wherein the first user feedback comprises user votes on the queued media item.

6. The media server of claim 1, wherein the first user feedback comprises searchable metadata related to the queued media item.

7. The media server of claim 1, wherein the first user feedback is responsive to feedback from at least one other portable media device.

8. The media server of claim 1, wherein the first user feedback comprises textual comments.

9. The media server of claim 8, wherein the textual comments comprise promotional comments related to the queued media item.

10. The media server of claim 1, wherein the second user feedback comprises textual comments.

11. The media server of claim 1, wherein the first user feedback comprises a message associated with the queued media item.

12. The media server of claim 11, wherein the message comprises information about an upcoming event related to the queued media item.

13. The media server of claim 1, wherein the second user feedback is a summary of the first user feedback.

14. The media server of claim 1, wherein the processor is configured to generate the updated playlist by adding the new media item to the first playlist based on the first user feedback.

15. A non-transitory computer readable storage medium having program code stored thereon, the program code including instructions that, when executed by a processor, causes the processor to execute a method comprising:
   receiving a first feedback from a first user using a first client device and a second feedback from a second user using a second client device when a first playlist is being played by a media server, wherein the first feedback and the second feedback are related to a queued media item included in the first playlist;
   generating a third feedback based on at least one of the first feedback and the second feedback;
   generating an updated playlist based on the first feedback and the second feedback, wherein the updated playlist includes a new media item not included in the first playlist, wherein the updated playlist comprises a difference from the first playlist, wherein the difference comprises one of the following: (i) a different set of media items than the first playlist and (ii) a different order of media items than the first playlist;
   causing the new media item to be streamed from one of the first client device and the second client device to the media server without storing the new media item on the media server;
   directing the media server to broadcast the updated playlist instead of the first playlist to the first client device and the second client device; and
   sending the updated playlist and the third feedback to at least one of the first client device and the second client device.

16. The computer readable storage medium of claim 15, wherein the method further comprises:
   causing the first playlist to be displayed on the first client device and on the second client device.

17. The computer readable storage medium of claim 15, wherein the method further comprises:
   causing the updated playlist to be displayed on the first client device and on the second client device.

18. The computer readable storage medium of claim 15, wherein the method further comprises:
   adding the new media item to the first playlist based on the first feedback and the second feedback.

19. The computer readable storage medium of claim 15, wherein generating the updated playlist step comprises:
   deleting a rejected media item from the first playlist based on the first feedback and the second feedback.

20. The computer readable storage medium of claim 15, wherein generating the updated playlist comprises reordering media items in the first playlist.

21. The computer readable storage medium of claim 15, wherein the first feedback is a text message.

22. The computer readable storage medium of claim 15, wherein the method further comprises:
causing the first feedback to be displayed on the second client device.

23. A system comprising:
a media server configured to play a first playlist; and
a plurality of portable media devices coupled to the media server, wherein:
the plurality of portable media devices are configured to receive metadata related to the first playlist from the media server;
the media server is further configured to receive a first feedback from the plurality of portable media devices when the media server is broadcasting the first playlist;
the first feedback is related to a queued media item included in the first playlist;
the media server is further configured to generate an updated playlist based on the first feedback, wherein the updated playlist includes a new media item not included in the first playlist, the adding including streaming the new media item from one of the plurality of portable media devices to the media server, wherein the updated playlist comprises a change from the first playlist, and wherein the change comprises one of the following: (i) a different set of media items than the first playlist and (ii) a different order of media items than the first playlist;
the media server is further configured to cause the new media item to be streamed from one of the plurality of portable media devices to the media server without storing the new media item on the media server;
the media server is further configured to broadcast the updated playlist instead of the first playlist to the plurality of portable media devices; and
the media server is further configured to send the updated playlist to at least one of the plurality of portable media devices.

24. The system of claim 23, wherein the-media server is configured to generate a second feedback based on the first feedback, wherein the updated playlist is generated further based on the second feedback.

25. A portable media device comprising:
a display;
a user input device; and
a processor configured to:
present on the display a remote application including metadata associated with a first playlist comprising a queued media item;
receive, via the user input device, a first feedback related to the queued media item;
transmit the first feedback to a communications interface of a media server, wherein the communications interface is configured to receive a second feedback related to the queued media item from at least one other portable media device; and
receive metadata associated with an updated playlist comprising the queued media item, wherein the updated playlist comprises a change from the first playlist, wherein the change comprises one of the following: (i) a different set of media items than the first playlist and (ii) a different order of media items than the first playlist, wherein the second feedback is indicative of the change; and
stream the queued media item to a media server to enable the media server to broadcast the queued media item to at least one other portable media device without storing the queued media item on the media server.

26. The portable media device of claim 25, wherein the processor is further configured to receive metadata related to the updated playlist from a remote server.

27. The portable media device of claim 26, wherein the processor is further configured to display the metadata related to the updated playlist on the display.

28. The portable media device of claim 25, wherein the processor is further configured to present the second feedback on the display.

29. A method for managing a playlist of media items comprising:
playing a first playlist at a media server;
receiving a first feedback from a first user using a first media device and a second feedback from a second user using a second media device at the media server when the media server is playing the first playlist, wherein the first feedback and the second feedback are related to a queued media item included in the first playlist;
generating a composite feedback at the media server based on the first feedback and the second feedback;
generating an updated playlist at the media server based on the composite feedback, wherein the updated playlist includes a new media item not included in the first playlist, wherein the updated playlist comprises a difference from the first playlist, and wherein the difference comprises one of the following: (i) a different set of media items than the first playlist and (ii) a different order of media items than the first playlist;
causing the new media item to be streamed from one of the first media device and the second media device to the media server without storing the new media item on the media server;
broadcasting the updated playlist instead of the first playlist from the media server to the first media device and the second media device.

30. The method of claim 29, further comprising:
causing a plurality of metadata associated with the updated playlist to be displayed on the first media device and on the second media device.

31. The method of claim 29, wherein generating the updated playlist comprises deleting the queued media item from the first playlist if the composite feedback is negative.

32. The method of claim 29, wherein generating the updated playlist comprises promoting the queued media item within the first playlist if the composite feedback is positive.

33. The method of claim 29, wherein the first feedback includes a tag.

34. The method of claim 29, wherein the generating the updated playlist comprises adding the new media item to the first playlist based on the composite feedback.

* * * * *